United States Patent
Yan et al.

(10) Patent No.: US 12,019,571 B1
(45) Date of Patent: Jun. 25, 2024

(54) COMMUNICATION METHOD FOR MULTI-CHIP NEURAL NETWORK ALGORITHM BASED ON FPGA MAIN CONTROL

(71) Applicant: ZHEJIANG LAB, Zhejiang (CN)

(72) Inventors: Li Yan, Hangzhou (CN); Songnan Ren, Hangzhou (CN); Zhiwei Liu, Hangzhou (CN); Tang Hu, Hangzhou (CN); Xiangdi Li, Hangzhou (CN); Jiani Gu, Hangzhou (CN); Chunling Hao, Hangzhou (CN); Xiao Yu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/389,783

(22) Filed: Dec. 20, 2023

Related U.S. Application Data (63) Continuation of application No. PCT/CN2023/101706, filed on Jun. 21, 2023.

(30) Foreign Application Priority Data

Mar. 17, 2023 (CN) .......................... 202310259598.5

(51) Int. Cl.
*G06F 13/20* (2006.01)
(52) U.S. Cl.
CPC .......... *G06F 13/20* (2013.01); *G06F 2213/40* (2013.01)
(58) Field of Classification Search
CPC ...... G06F 13/20; G06F 13/36; G06F 2213/40; G06F 2213/4002; G06F 2213/4004
See application file for complete search history.

(56) References Cited

FOREIGN PATENT DOCUMENTS

| CN | 104702474 A | 6/2015 |
|---|---|---|
| CN | 106789507 A | 5/2017 |
| CN | 112583683 A | 3/2021 |
| CN | 115733569 A | 3/2023 |
| CN | 115964333 A | 4/2023 |

(Continued)

OTHER PUBLICATIONS

International Search Report (PCT/CN2023/101706); Date of Mailing: Sep. 28, 2023.

(Continued)

*Primary Examiner* — Raymond N Phan
(74) *Attorney, Agent, or Firm* — W&G Law Group

(57) ABSTRACT

A communication method for a multi-chip neural network algorithm based on a FPGA main control, which designs original data frames, status frames, layered data frames, layered weight frames, computation result frames, layered data request frames, layered weight request frames, computation result request frames and running status request frames, and then completes image processing based on the neural network algorithm according to the scheduling of transmitting and receiving processes. The present disclosure ensure that communication of multi-layer data structures and various data types based on the neural network algorithm, and accurately schedules the transmitting and receiving of data required by the main control and each chip in the multi-chip system, and sends out data request commands; it plays a very active role in receiving, transmitting and feeding back the running status of the chip and the errors and error types.

10 Claims, 7 Drawing Sheets

(56) References Cited

FOREIGN PATENT DOCUMENTS

| | | |
|---|---|---|
| WO | 2020015201 A1 | 1/2020 |
| WO | 2023025299 A1 | 3/2023 |

OTHER PUBLICATIONS

First Office Action(CN202310259598.5); Date of Mailing: Apr. 18, 2023.

New-Development-of-Artificial-Cognitive-Computation: True-North-Neur-on-Chip.

CNN-Grinder: From-Algorithmic-to-High-Level-Synthesis-descriptions-of-CNNs-for-Low-end-low-cost-FPGA-SoCs.

| Frame instruction segment | | | Numerical status segment | | | Data segment *N | Verification segment |
|---|---|---|---|---|---|---|---|
| Frame start code | Frame identification code | Frame type code | Numerical length code N | Layer number information | Frame height | Data | Verification value |
| | | 00 | | | Frame width | | |

FIG. 4

| Frame instruction segment | Frame start code | Frame identification code | Frame type code |
|---|---|---|---|
| | | | 00 |
| Numerical status segment | 00000000 | Request type | Image frame height | Image frame width |

FIG. 5

| Frame instruction segment | Frame start code | Frame identification code | Frame type code |
|---|---|---|---|
| | | | 00 |
| Numerical status segment | Status type value | | |

COMMUNICATION METHOD FOR MULTI-CHIP NEURAL NETWORK ALGORITHM BASED ON FPGA MAIN CONTROL

CROSS-REFERENCE TO RELATED APPLICATIONS

The present application is a continuation of International Application No. PCT/CN2023/101706, filed on Jun. 21, 2023, which claims priority to Chinese Application No. 202310259598.5, filed on Mar. 17, 2023, the contents of both of which are incorporated herein by reference in their entireties.

TECHNICAL FIELD

The present disclosure relates to the field of communication, and in particular, to a communication method for a multi-chip neural network algorithm based on a Field Programmable Gate Array (FPGA) main control.

BACKGROUND

Multi-chip cooperation is an important way to address the problem of insufficient function and computing power of a single chip. In current multi-chip communication setups, the main method of multi-chip cooperation is to use one chip as the main control chip. With the rapid development in Field Programmable Gate Array (FPGA) technology, the diverse functionalities, convenient circuit adjustment, and flexible pin interface thereof significantly reduce the development time of multi-chip system. Multi-chip communication based on FPGA plays an exceptionally positive role in promoting the realization of such system.

However, in the prior art, there is a lack of specific communication method for a multi-chip neural network algorithm based on a FPGA main control. The deficiency hampers the completion of communication involving multi-layered data structures and diverse data types based on artificial intelligence neural network algorithms. The existing methods struggle to clearly define corresponding data types and layers, accurately perform corresponding functions, transmit the necessary data, and timely feedback on the status of data transmission.

SUMMARY

In view of the shortcomings of the prior art, the present disclosure aims to provide a communication method for a multi-chip neural network algorithm based on a FPGA main control.

In order to achieve the above object, the technical solution adopted by the present disclosure is that the present disclosure provides a communication method for a multi-chip neural network algorithm based on a FPGA main control, which includes the following steps:

(1) Constructing a frame structure by a multi-chip structure based on a FPGA main control. The frame structure includes an original data frame, a status frame, a layered data frame, a layered weight frame, a computation result frame, a layered data request frame, a layered weight request frame, a computation result request frame and an running status request frame; the multi-chip structure based on a FPGA main control guides a main control interface module and a chip data reception module to realize data communication for a chip or a chipset.

(2) Initiating the data transmission by the original data frame or the request frame, including data transmission and data request from the FPGA main control transmitting data and requesting data to the chip or the chipset, as well as data request from the chip or the chipset to the FPGA main control.

(3) Transmitting data from the FPGA main control to the chip or the chipset, storing and computing data after receiving the data by the chip, and transmitting a computation result to the FPGA main control; if there is a transmission error in a de-framing and verification process during transmission of the FPGA main control, a receiver transmitting an error frame; and if there are status requests and control requirements during the transmission of the FPGA main control, the FPGA main control transmitting the status requests or control commands to the chip or chipset.

(4) Transmitting a data transmission request frame from the FPGA main control to the chip or the chipset, and transmitting the data or data storage or the computation result to the FPGA main control after receiving the data transmission request frame by the chip; requesting data from the FPGA main control to the chip, and transmitting the data from the FPGA main control to the chip or the chipset; if there are transmission errors in a de-framing and verification process during the transmission of the FPGA main control, the receiver transmitting an error frame; and if there are status requests and control requirements during the transmission of the FPGA main control, the FPGA main control transmitting the status requests or control commands to the chip or the chipset.

Further, the frame structure is specifically as follows:

The original data frame includes a frame instruction segment, a numerical status segment, a data segment and a verification segment. The frame instruction segment includes a frame start code, a frame identification code and a frame type code; the numerical status segment is a data structure, including a frame start code, an image frame height and an image frame width; the data segment includes data to be transmitted grouped into sets of 32 bits for each transmission according to the data to be transmitted, a data arrangement mode is from a bottom bit to a high bit, and the high bit is supplemented by 0 for a last data segment less than 32 bits; and the verification segment adopts a checksum method to negate all data values of the frame instruction segment, the numerical status segment, the data segment and the verification segment by 1, and the data values are arranged from high to low, with high bits less than 32 bits being supplemented by 0, and the high bits exceeding 32 bits being reduced by 32 bits.

The status frame includes the frame instruction segment and the numerical status segment. The frame instruction segment includes a frame start code, a frame identification code and a frame type code, and the numerical status segment includes a receiving correct status, a data counting error status, a data verification error status and a chip running error status.

The layered data frame, the layered weight frame and the computation result frame all include a frame instruction segment, a numerical status segment, a data segment and a verification segment. The frame instruction segment includes a frame start code, a frame identification code and a frame type code; the numerical status segment includes a data length code, layer number information, an image frame height and an image frame width; a framing method of the data segment is consistent with the original data frame; a verification method of the verification segment is consistent with the original data frame.

The layered data request frame, the layered weight request frame and the computation result request frame all include a frame instruction segment and a numerical status segment, and the layered data request frame, the layered weight request frame and the computation result request frame are used for requesting the layered data frame, the layered weight frame and the computation result frame respectively. The frame instruction segment includes a frame start code, a frame identification code and a frame type code; the numerical status segment includes a data length code, layer number information, an image frame height and an image frame width.

The running status request frame includes a frame instruction segment and a numerical status segment. The frame instruction segment includes a frame start code, a frame identification code and a frame type code; the numerical status segment includes a frame reception completion status, a frame reception error status, a chip status request frame, a main control FPGA status request frame and a status command given to the chip by the FPGA main control.

Further, the transmission of the chip or chipset can be simultaneously controlled by adjusting the structure of the frame instruction segment; the transmitting of the first 32 bits of each frame are used to guide the FPGA main control interface module and the chip data reception module, and the corresponding frame information is transmitted to the chip or the chipset corresponding to the frame identification code according to the frame type code. The frame instruction segment includes transmitting according to a data number, repeated transmitting with a first bit being ignored, repeated transmitting with a first bit and a second bit being ignored, repeated transmitting with a first bit, a second bit and a third bit being ignored, repeated transmitting with a first bit, a second bit, a third bit and a fourth bit being ignored, repeated transmitting of all bits, allowing the data to be transmitted to the corresponding chip or the corresponding 2, 4, 8, 16 and 32 chips to repeatedly send the data.

Further, the original data or any layer of data, a total length of data, the data structure and a number of a layer to which the data belongs can be flexibly adjusted according to a binary or multivalued neural network algorithm; the original data frame, the layered data frame or the layered weight frame are used to realize the transmission of data required by the neural network algorithm, and then the frames are assembled, and the assembled frame is transmitted to the chip or chipset; after receiving, computation is performed on the chip or chipset, and then the chip sends the computation result frame to the main control.

Further, the method can use a multi-application scene neural network algorithm of images, characters, voices, faces, objects and behaviors, and original data, intermediate operation data, weight and operation result data in each scene are all transmitted by the method; and the method can handle the transmission of binary, ternary and multivalued data and binary, ternary and multivalued weights in the neural network algorithm.

Further, the multi-chip structure based on the FPGA main control includes a FPGA main control system and a plurality of chip nodes; the FPGA main control system is connected with each chip node through a data connection line and a chip selection signal line.

Further, the FPGA main control or chip initiates a layered data request, a layered weight request or a computation result request to the other party at any time before, during and after the computation, and transmits the data, weights and computation results to be transmitted.

Further, the FPGA main control monitors and controls the status of the multi-chip system, and obtains a chip running status and a FPGA main control running status request frame through a running status request; and for the chip with a poor running status, the FPGA main control can adjust the chip running status by giving a status command to the chip.

The present disclosure further provides a communication device of a multi-chip neural network algorithm based on a FPGA main control, including one or more processors for implementing the above communication method for a multi-chip neural network algorithm based on a FPGA main control.

The present disclosure further provides a computer-readable storage medium on which a program is stored. When executed by a processor, the program is used to implement the above communication method for a multi-chip neural network algorithm based on a FPGA main control.

The present disclosure has the following beneficial effects: it is suitable for completing the image processing based on a neural network algorithm, and it plays a very active role in the communication of multi-layer data structures and various data types, accurately scheduling the transmitting and receiving of data required by the main control and each chip in a multi-chip system, accurately defining its data structure, and transmitting out data request commands, and giving feedback on the receiving, transmitting, chip running status and errors and error types.

DESCRIPTION OF EMBODIMENTS

The object and effect of the present disclosure will become more apparent when the present disclosure is described in detail according to the attached drawings and preferred embodiments. It should be understood that the specific embodiments described here are only for explaining the present disclosure and are not used to limit the present disclosure.

First, the technical terms are explained:

(1) FPGA: Field Programmable Gate Array;

(2) SOC: System on Chip;

(3) AMBA: Advanced Microcontroller Bus Architecture.

The present disclosure can complete the communication of multi-layer data structures and various data types based on neural network algorithm, and accurately schedule the transmitting and receiving of data required by the main control and each chip in the multi-chip system, and accurately define its data structure; it may feedback the receiving, transmitting, chip running status, errors and error types by transmitting data request commands.

Example 1

Figure 1:
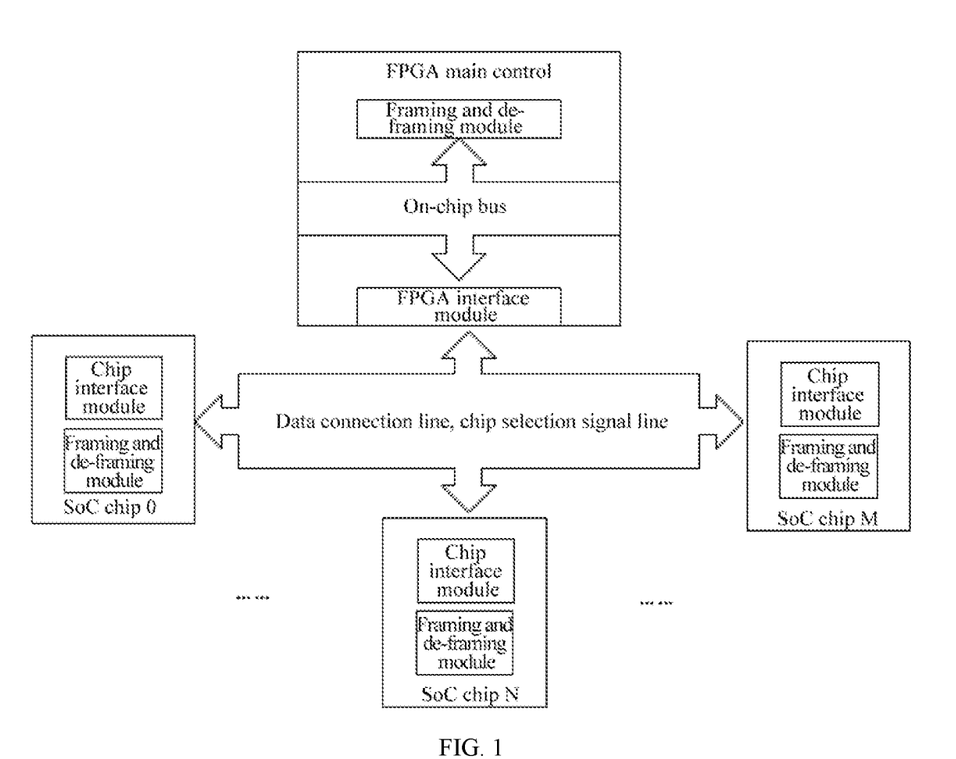
FIG. 1 is a schematic diagram of a multi-chip structure based on a FPGA main control of the present disclosure.

The specific execution process of the communication method for a multi-chip neural network algorithm based on a FPGA main control provided by the present disclosure is as follows:

Step 1: a multi-chip structure based on a FPGA main control is constructed, as shown in the schematic diagram of a multi-chip structure based on a FPGA main control in FIG. 1, which includes a FPGA main control system and a plurality of SoC chip nodes; the FPGA main control system is connected with each SoC chip node through a data connection line and a chip selection signal line; the FPGA main control system includes a framing and de-framing module and a FPGA interface module, which are connected through an on-chip bus; the SoC chip node includes a chip interface module and a framing and de-framing module. FIG. 1 shows only three chip nodes, where N<=31, which means no more than 32 nodes. Data transmission is carried out between the FPGA main control system and each SoC chip node through a common data interface, and all parties adopt the same data transmission protocol. When transmitting data, the FPGA main control determines the chip number or chipset number of the data to be transmitted by reading the frame number of the frame instruction segment of the frame structure, and then selects the corresponding chip through the chip selection signal. If the data to be transmitted is a chipset, it is transmitted according to the principle that the chip number is from small to large. In the process of data reception, the FPGA main control sends data from the chip corresponding to the selection signal selected first according to the first-come-first-served principle. If there is simultaneous selection, the data is received according to the chip number from small to large.

The frame structure is constructed by a multi-chip structure based on a FPGA main control, and the frame structure includes an original data frame, a status frame, a layered data frame, a layered weight frame, a computation result frame, a layered data request frame, a layered weight request frame, a computation result request frame and a running status request frame. Each frame structure includes a frame instruction segment and a frame status segment; among them, the frame instruction segment structure of each frame structure is consistent, all of which are 32 bits, and the frame instruction segment structure includes a frame start code, a frame identification code and a frame type code; the frame status segment is framed differently according to different frame types. The frame structures of the original data frame, the layered data frame, the layered weight frame and the computation result frame include a frame data segment and a frame verification segment; the frame data segment and the frame verification segment are framed differently according to different frame types.

Figure 2:
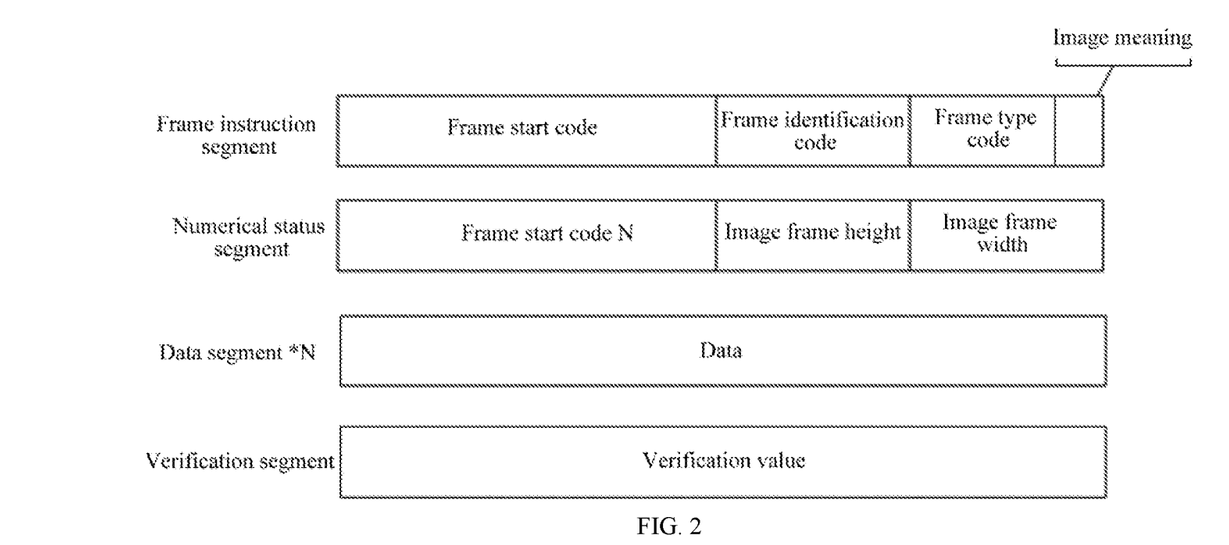
FIG. 2 is a schematic diagram of the structure of an original data frame of the present disclosure.

Referring to the schematic diagram of the original data frame structure in FIG. 2. The original data frame includes a frame instruction segment, a numerical status segment, a data segment and a verification segment. The frame instruction segment includes a frame start code, a frame identification code and a frame type code; the numerical status segment is a data structure, including a frame start code, an image frame height and an image frame width. The frame instruction segment of the original data frame includes a 16-bit frame start code including the frame instruction segment, and when a transmitting command is started, a frame coding module takes the specific byte start code as the frame start code for transmitting data; in the receiving process, after the frame start code is received, it enters the frame start code check, and if the check passes, a frame start check pass signal is triggered, and if the check fails, an error signal is triggered. In the transmission process, the frame identification code of the frame instruction segment is 8 digits in total, and the first 3 digits of the frame identification code indicate the transmission mode, including transmitting according to the data number, repeated transmitting with a first bit being ignored, repeated transmitting with a first bit and a second bit being ignored, repeated transmitting with a first bit, a second bit and a third bit being ignored, repeated transmitting with a first bit, a second bit, a third bit and a fourth bit being ignored, repeated transmitting of all bits, so that data can be guaranteed to be transmitted to the corresponding chip or the corresponding 2, 4, 8, 16 and 32 chips to repeatedly send data; the last 5 digits of the frame identification code indicate that data is transmitted to the corresponding numbered chip, and communication of 32 chips in total is supported communication between 00000 and 11111. The first three digits of the received data are all defined as 000, and the last five digits are the corresponding chip number, and then the data is processed according to the chip model corresponding to the received data. The frame type code of the frame instruction segment is 8 bits in total, and the upper 6 bits of the frame type code are the structure representing the specific meaning of the frame, and the original data frame is 000001; the lower two bits of the frame type code are the structure that indicates the meaning of the frame image type. The original data frame includes single-valued data frame 00, binary image frame 01, ternary image frame gray level image frame 10 and color image frame 11. The data segment is the data to be transmitted, and every 32 bits are grouped to be transmitted according to the data to be transmitted each time, and the data arrangement mode is from low bit to high bit; for the last data segment with less than 32 bits, the high-order bit is supplemented by 0. The counter starts counting after data reception, and the remaining data will not be received after counting. In the verification segment, all the data values of the instruction segment, the numerical status segment, the data segment and the verification segment of the aforementioned frame are inverted and added by 1, and arranged according to the high and low bits, and the high bits less than 32 bits are supplemented by 0.

Figure 3:
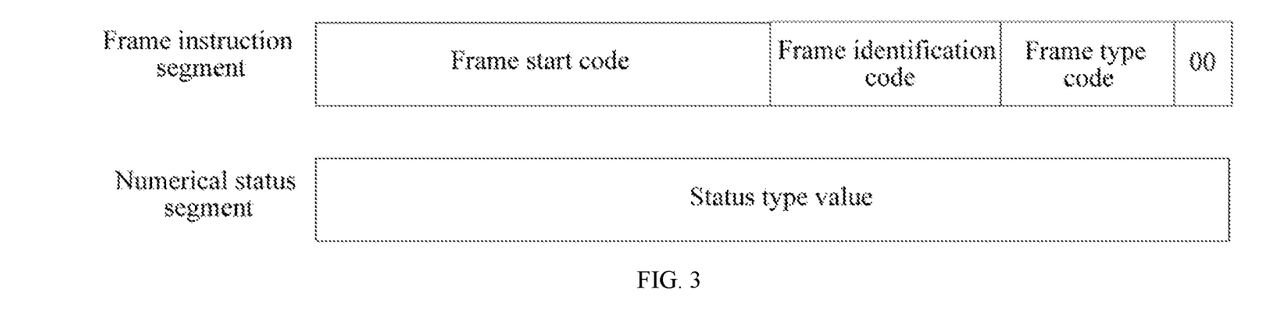
FIG. 3 is a schematic diagram of the structure of a status frame of the present disclosure.

Referring to the structural schematic diagram of the status frame in FIG. 3, the frame instruction segment of the status frame includes a frame instruction segment and a numerical status segment. The frame instruction segment includes a frame start code, a frame identification code and a frame type code. The last two bits of the frame instruction segment of the status frame are 0; there are 32 bits in the numerical status segment of the status frame, including all 32 bits of the frame reception completion status of 0. The error status types include data counting error 01, data verification error 01 and chip running error 110, and also include main control FPGA status correctness 111, FPGA status error 1101, chip status correctness 1110, chip status error 1111 and main control expected chip silence 10000; the status frame does not contain data segment or verification segment.

Figure 4:
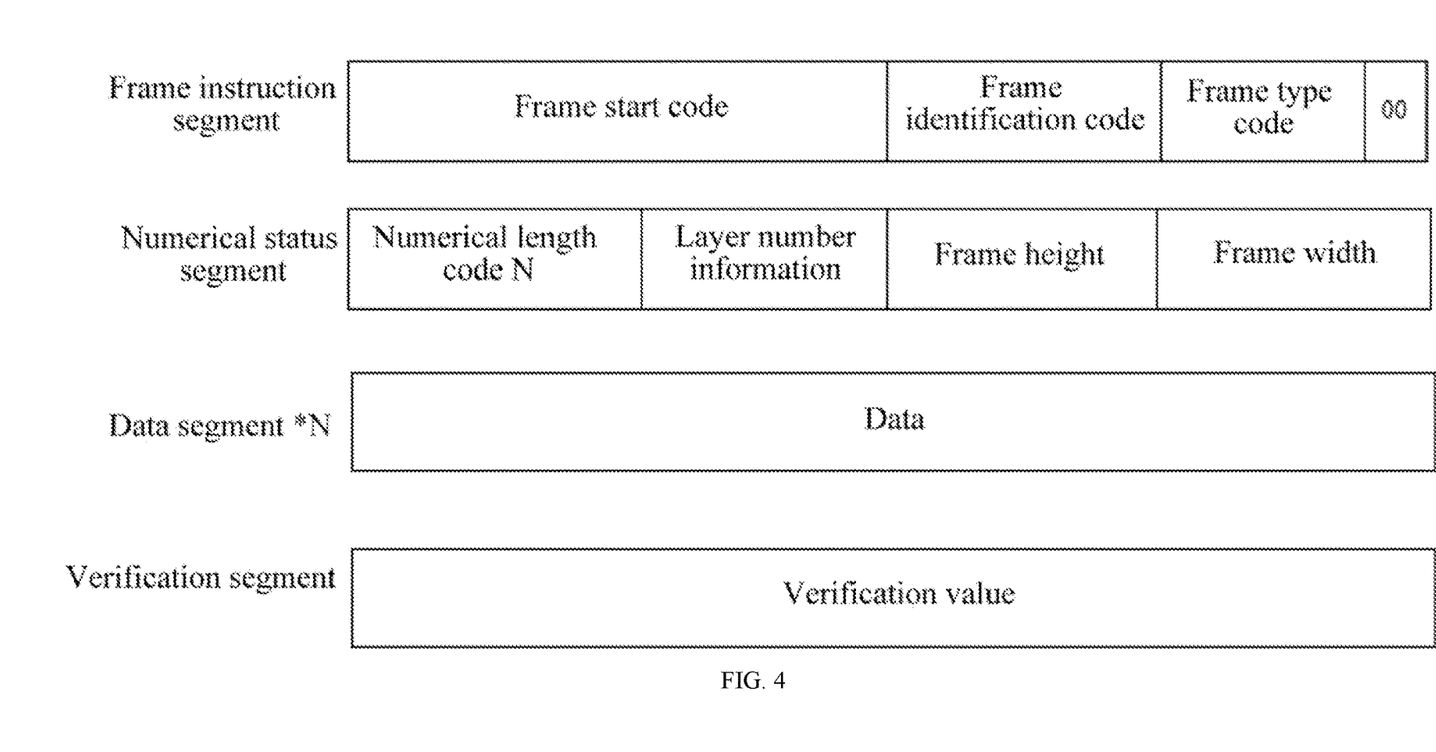
FIG. 4 is a schematic diagram of the layered data frame, layered weight frame and computation result frame of the present disclosure.

Referring to the structural schematic diagram of the layered data frame, the layered weight frame and the computation result frame in FIG. 4, the layered data frame, the layered weight frame and the computation result frame all include a frame instruction segment, a numerical status segment, a data segment and a verification segment. The frame instruction segment includes a frame start code, a frame identification code and a frame type code. The frame type codes of the frame instruction segment of the layered data frame, the layered weight frame and the computation result frame are all 8 bits in total, and the upper 6 bits are the structure representing the specific meaning of the frame. The original data frame is 000011, and the last two bits of the frame instruction segment are 0. The numerical status segment includes 32 bits in total, with the upper 8 bits representing the numerical size, and its numerical value is represented as N; the total length of the data segment is N*32, indicating that there is N*32 bits of original data transmission, and the next highest 8 bits are layer information, indicating which layer of the algorithm this data frame and weight frame belong to; the lower 16 bits represent the image, in which the upper 8 bits represent the image frame height and the lower 8 bits represent the image frame width, and the total length of the original data frame is 32*(N+1) bits. The counter starts counting after data reception, and the remaining data is no longer received as data after counting. In the verification segment, all the data values of the instruction segment, the numerical status segment, the data segment and the verification segment of the aforementioned frame are inverted and added by 1 according to the checksum method, and arranged according to the high and low bits, and the high bits less than 32 bits are supplemented by 0.

Figure 5:
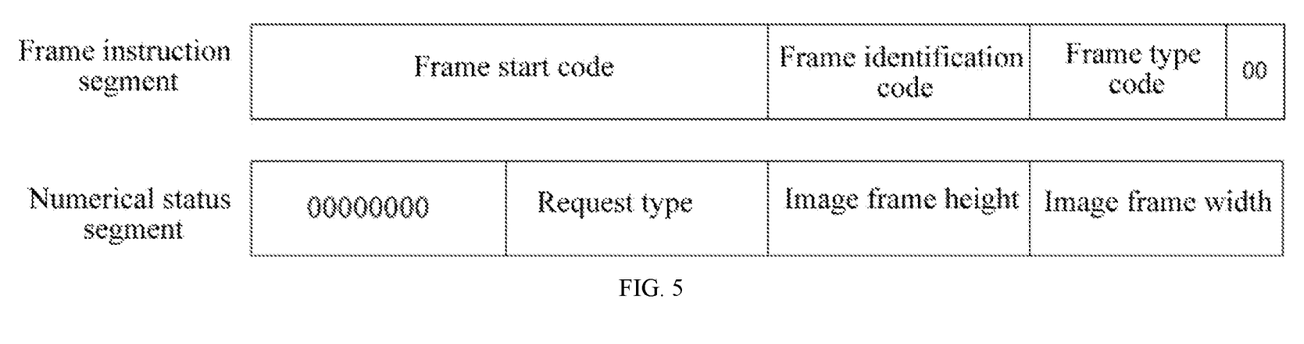
FIG. 5 is a schematic structural diagram of a layered data request frame, a layered weight request frame and a computation result request frame according to the present disclosure.

FIG. 5 is a schematic structural diagram of a layered data request frame, a layered weight request frame and a computation result request frame. The layered data request frame, the layered weight request frame and the computation result request frame all include a frame instruction segment and a numerical status segment, which are respectively used for requesting the layered data frame, the layered weight frame and the computation result frame. The frame instruction segment includes a frame start code, a frame identification code and a frame type code; the numerical status segment includes a data length code, a layer number information, an image frame height and an image frame width. The frame type codes of the frame instruction segments of the layered data request frame, the layered weight request frame and the computation result request frame are all 8 bits in total, and the upper 6 bits are the structure representing the specific meaning of the frame. The original data frame is 000100, and the last two bits of the frame instruction segment are 0. There are 32 bits in the numerical status segment, of which the upper 8 bits indicate the required numerical size, and its numerical value is N, and the total length of the data segment is N*32, indicating that the FPGA main control needs to read the original data of N*32 bits; the next highest 8 bits are layer information, indicating which layer the data frame and weight frame belong to; the lower 16 bits represent the image, in which the upper 8 bits represent the height of the image frame and the lower 8 bits represent the width of the image frame. The layered data request frame, layered weight request frame and computation result request frame do not contain data segments or verification segments.

Figure 6:
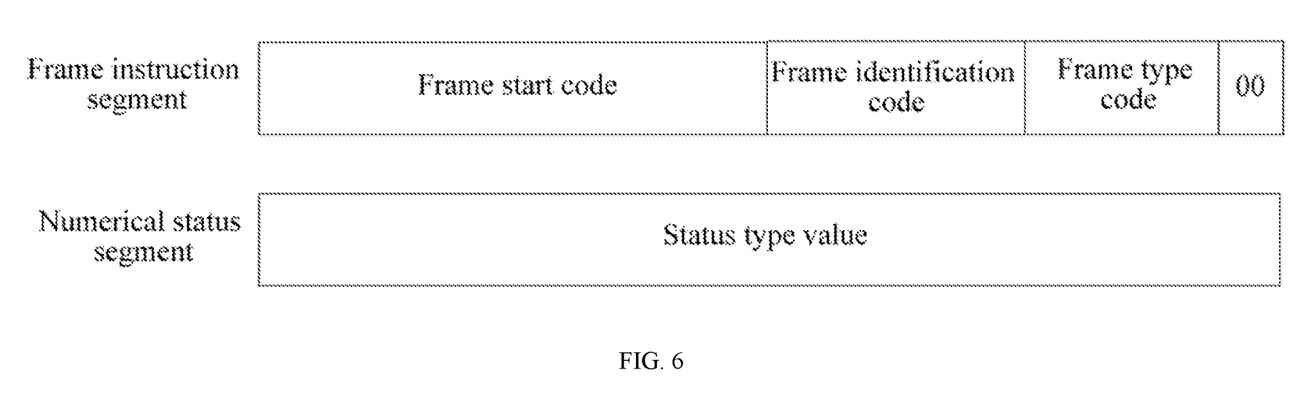
FIG. 6 is a schematic diagram of the structure of a running status request frame according to the present disclosure.

FIG. 6 is a schematic structural diagram of a running status request frame, which includes a frame instruction segment and a numerical status segment. The frame instruction segment includes a frame start code, a frame identification code and a frame type code. The frame type code of the frame instruction segment of the running status request frame is 8 bits in total, and the upper 6 bits are the structure representing the specific meaning of the frame. The original data frame is 000101, and the last two bits of the frame instruction segment are 0. The numerical status segment consists of 32 bits, including frame reception completion status, frame reception error status, chip status request frame, main control FPGA status request frame and status command given from the main control to the chip, while the running status request frame does not include data segments or verification segments.

Step 2: according to the design of different algorithms, after the data acquisition is completed, the main control FPGA carries out task distribution and data integration, and the main control FPGA executes some or all algorithms and gives them to the chip for execution, and the data transmission is initiated by the original data frame or the request frame; the FPGA main control sends data to the corresponding chip or chipset, which is original data or processed layered data; the FPGA main control requests data from the corresponding chip or chipset, which is mainly layered result data, final operation result data or trained weight data after chip processing; the chip or chipset requests data from the FPGA main control, which is mainly the further data that the chip or chipset requests from the main control after the computation is completed.

Figure 7:
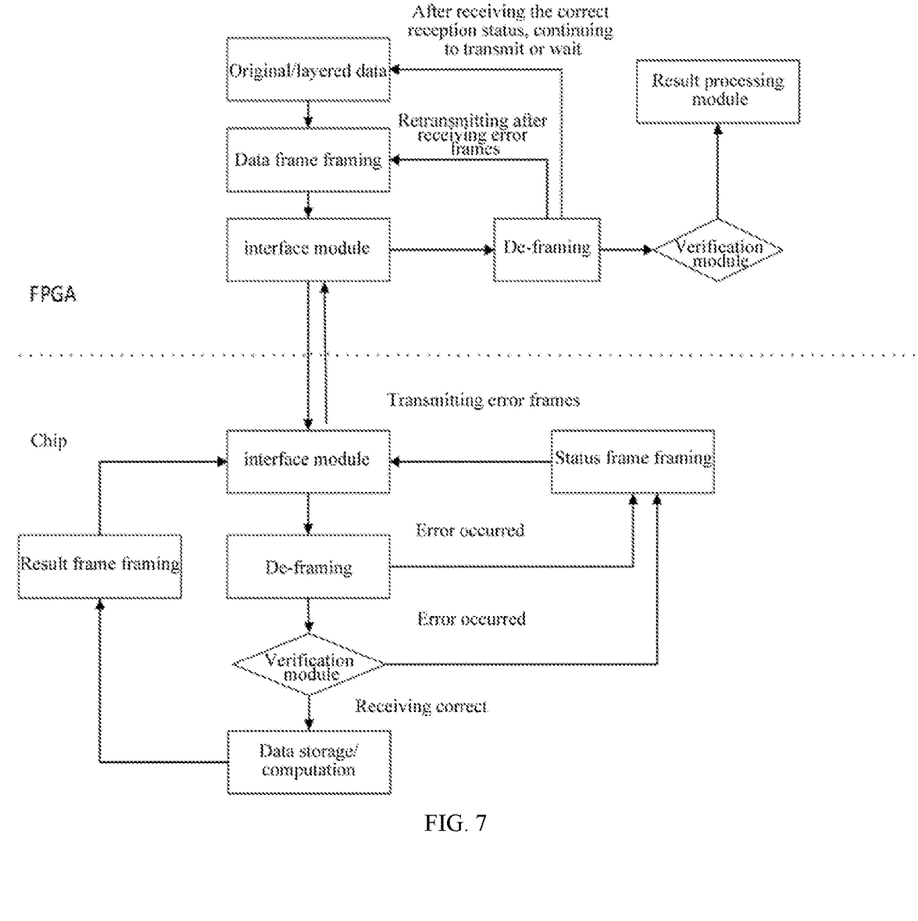
FIG. 7 is a schematic diagram of the original data and layered data transmission and processing flow of the present disclosure.

Step 3, the FPGA main control transmits data to the corresponding chip or chipset, and after the corresponding chip receives the data, the data is stored or calculated, and then the computation result is transmitted to the FPGA main control; if a transmission error occurs in the process of de-framing and checking during the transmission of the FPGA main control, the receiver will transmit an error frame; if the FPGA main control transmits a status request and a control requirement, the FPGA main control transmits status data to the corresponding chip or chipset. Referring to the schematic diagram of the original data and layered data transmission and processing flow in FIG. 7, when there is original data transmission or layered data task transmission for the FPGA main control, the data to be transmitted is framed in the above manner, and then the data is transmitted to the corresponding chip or chipset through the interface module; after receiving the data, the chip terminal firstly de-frames the data, and if the frame header is inconsistent with the agreement, it means that an error has occurred, and the chip terminal enters the status frame framing and sends an error frame; if the frame header is correct, it continues to receive the data, and checks the data after the data is received; if the check result is incorrect, it means that an error has occurred, and the chip end enters the status frame framing and sends an error frame; if the frame header is correct upon checking, the data is stored and calculated. After the data storage and computation are completed, the chip will receive the correct result or computation result for framing and send it to the FPGA main control through the interface. Aft receiving that error frame, the FPGA main control re-frames the corresponding data frame and re-transmits the data; after the FPGA main control receives the correct frame, it continues to send data, and enters the waiting status if the transmission is completed; after receiving the computation result frame, the FPGA main control enters a result processing module.

Figure 8:
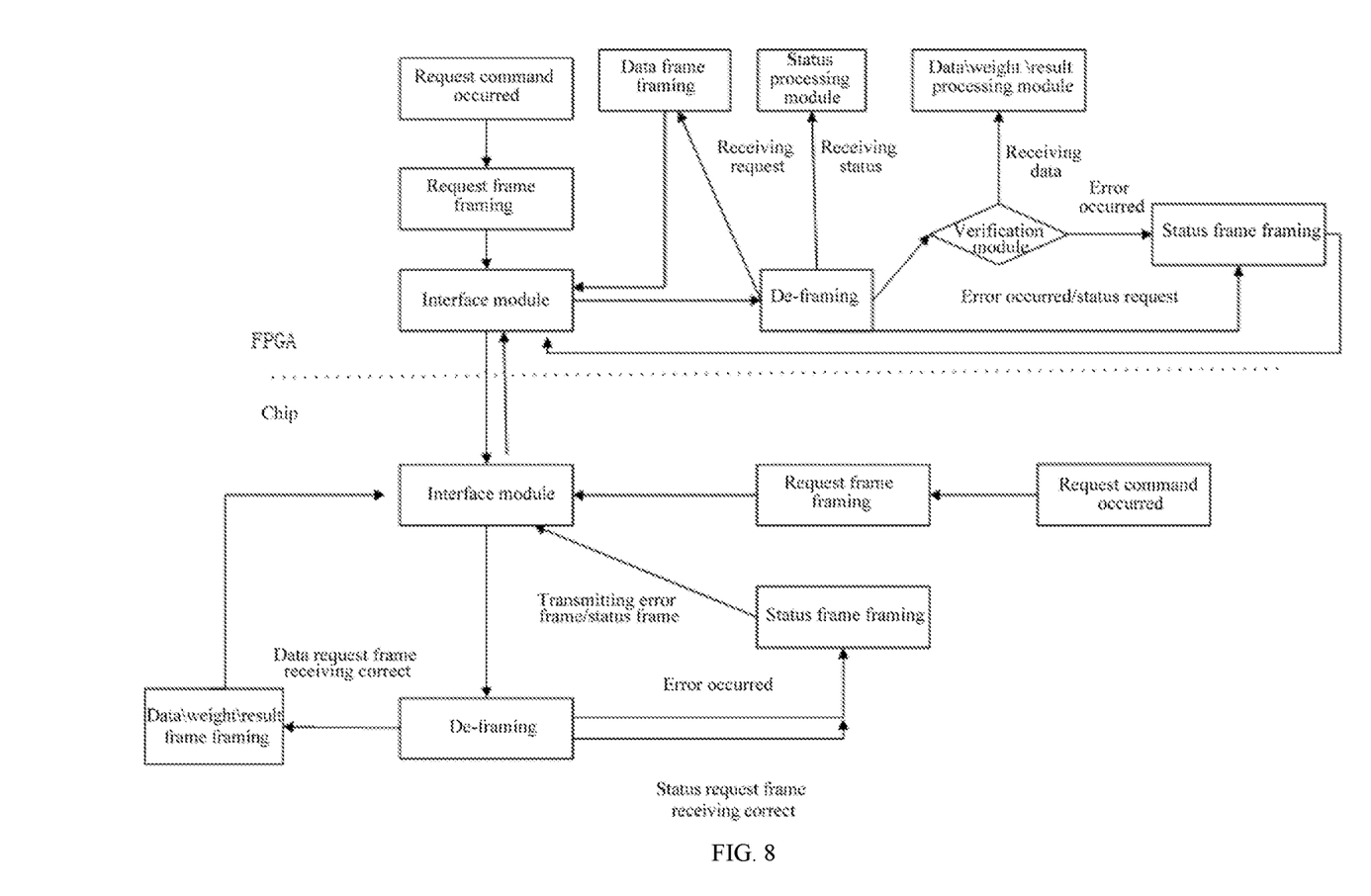
FIG. 8 is a schematic diagram of data transmission and processing flow with request frames according to the present disclosure.

Step 4, the FPGA main control sends a data transmission request frame to the corresponding chip or chipset, and after the corresponding chip receives the request frame, the corresponding data or data storage or computation result is transmitted to the FPGA main control; or the chip requests data from the FPGA main control, and the FPGA main control transmits data to the corresponding chip or chipset. If there is a transmission error in the process of frame de-framing and checking during the transmission of the FPGA main control, the receiver transmits an error frame. If there is a status request and control demand during the transmission by the FPGA main control, the FPGA main control transmits a status request or control command to the corresponding chip or chipset. Referring to the schematic diagram of data transmission and processing flow with request frames in FIG. 8, when the FPGA main control transmits data request tasks, the request frames to be transmitted are framed in the above manner, and then the data is transmitted to the corresponding chip or chipset through the interface module; after receiving the data, the chip terminal firstly de-frames, and if the frame header is inconsistent with the agreement, it means that an error has occurred, and the chip terminal enters the status frame framing and sends an error frame; if the reception is correct, the chip terminal frames according to the corresponding data, weight and result frames, and then sends them to the FPGA main control through the interface module; after receiving that error frame, the FPGA main control re-frames the corresponding data frame, and then re-transmits the data; after the FPGA main control receives the data transmission frame, if the frame header is inconsistent with the agreement, it means that an error has occurred, and the main control terminal enters the status frame framing and sends the error frame; when the chip terminal sends a data request task to the FPGA main control, its transmitting and responding mode is consistent with that initiated by the FPGA main control.

The communication method for a multi-chip neural network algorithm based on a FPGA main control can use a multi-application scene neural network algorithm of images, characters, voices, faces, objects and behaviors, and original data, intermediate operation data, weight and operation result data in each scene are all transmitted by the method; the communication method for a multi-chip neural network algorithm based on a FPGA main control can flexibly process the binary, ternary and multivalued data and the translation of the binary, ternary and multivalued weights in the neural network algorithm.

Example 2

Figure 9:
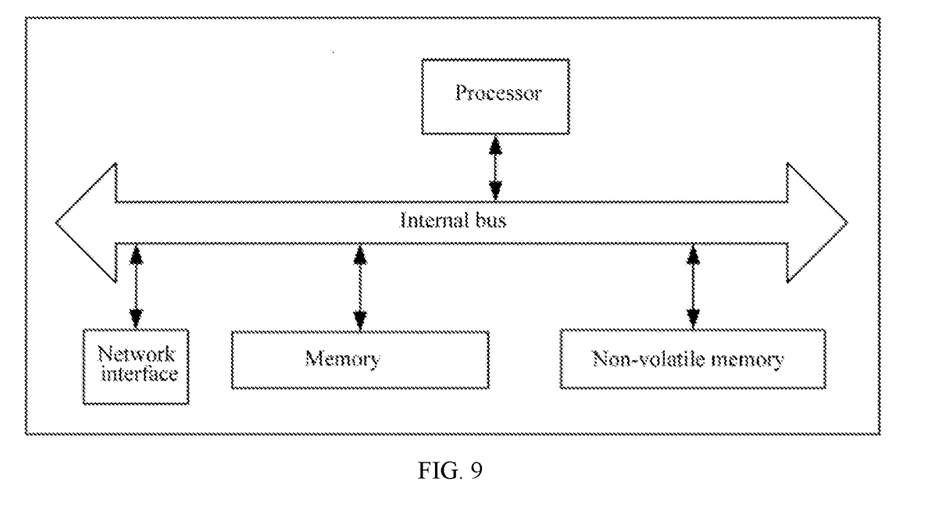
FIG. 9 is a communication device diagram of a multi-chip neural network algorithm based on a FPGA main control provided by an embodiment of the present disclosure.

Referring to FIG. 9, a communication device of a multi-chip neural network algorithm based on a FPGA main control provided by an embodiment of the present disclosure includes one or more processors for implementing the communication method for a multi-chip neural network algorithm based on a FPGA main control in the above embodiment.

The embodiment of the communication device of a multi-chip neural network algorithm based on a FPGA main control of the present disclosure can be applied to any equipment with data processing capability, which can be devices or devices such as computers. The embodiment of the device can be realized by software, or by hardware or a combination of hardware and software. Taking software implementation as an example, as a logical device, it is formed by reading the corresponding computer program instructions in the non-volatile memory into the memory through the processor of any equipment with data processing capability. From the hardware level, as shown in FIG. 9, it is a hardware structure diagram of any equipment with data processing capability where the communication device of a multi-chip neural network algorithm based on a FPGA main control of the present disclosure is located. Besides the processor, memory, network interface and nonvolatile memory shown in FIG. 9, any equipment with data processing capability where the device is located in the embodiment usually includes other hardware according to the actual function of the equipment with data processing capability, which will not be described here again.

The implementing process of the functions and functions of each unit in the above-mentioned device is detailed in the realization process of the corresponding steps in the above-mentioned method, and will not be repeated here.

For the device embodiment, since it basically corresponds to the method embodiment, it is only necessary to refer to part of the description of the method embodiment for the relevant points. The device embodiments described above are only schematic, in which the units described as separate components may or may not be physically separated, and the components displayed as units may or may not be physical units, that is, they may be located in one place or distributed to multiple network units. Some or all of the modules can be selected according to actual needs to achieve the purpose of the solution of the present disclosure. Those skilled in the art can understand and implement it without creative labor.

The embodiment of the present disclosure also provides a computer-readable storage medium, on which a program is stored, which, when executed by a processor, implements the communication method for a multi-chip neural network algorithm based on a FPGA main control in the above embodiment.

The computer-readable storage medium can be an internal storage unit of any equipment with data processing capability as described in any of the previous embodiments, such as a hard disk or a memory. The computer-readable storage medium can also be any equipment with data processing capability, such as a plug-in hard disk, a Smart Media Card (SMC), an SD card, a Flash Card and the like. Further, the computer-readable storage medium can also include both internal storage units and external storage devices of any device with data processing capability. The computer-readable storage medium is used for storing the computer program and other programs and data required by any equipment with data processing capability, and can also be used for temporarily storing data that has been output or will be output.

It should be understood by those skilled in the art that the above is only a preferred example of the present disclosure, and it is not used to limit the present disclosure. Although the present disclosure has been described in detail with reference to the above examples, it is still possible for those skilled in the art to modify the technical solution described in the above examples or replace some technical features equally. Any modification and equivalent substitution within the spirit and principle of the present disclosure should be included in the scope of protection of the present disclosure.

The above embodiments are only used to illustrate the design ideas and characteristics of the present disclosure, and their purpose is to enable those skilled in the art to understand the contents of the present disclosure and implement it accordingly. The protection scope of the present disclosure is not limited to the above embodiments. Therefore, all equivalent changes or modifications made according to the principles and design ideas disclosed in the present disclosure shall be within the protection scope of the present disclosure.

What is claimed is:

1. A communication method for a multi-chip neural network algorithm based on a Field Programmable Gate Array (FPGA) main control, comprising:
   step (1), constructing a frame structure by a multi-chip structure based on the FPGA main control, wherein the frame structure comprises an original data frame, a status frame, a layered data frame, a layered weight frame, a computation result frame, a layered data request frame, a layered weight request frame, a computation result request frame and an running status request frame; and guiding a FPGA main control interface module and a chip data reception module by the multi-chip structure based on the FPGA main control to realize data communication for a chip or a chipset;
   step (2), initiating the data transmission by the original data frame or the request frame, comprising data transmission and data request from the FPGA main control to the chip or the chipset, and data request from the chip or the chipset to the FPGA main control;
   step (3), transmitting data from the FPGA main control to the chip or the chipset, storing and computing data after receiving the data by the chip, and transmitting a computation result to the FPGA main control; wherein when a transmission error occurs in a de-framing and verification process during transmission of the FPGA main control, an error frame is transmitted by a receiver; and when there are status requests and control requirements during the transmission of the FPGA main control, the status requests or control commands are transmitted by the FPGA main control to the chip or the chipset; and
   step (4), transmitting a data transmission request frame from the FPGA main control to the chip or the chipset, and transmitting the data or data storage or computation result to the FPGA main control after receiving the data transmission request frame by the chip; requesting data from the FPGA main control to the chip, and transmitting the data from the FPGA main control to the chip or the chipset; wherein when a transmission error occurs in the de-framing and verification process during transmission of the FPGA main control, the receiver transmitting an error frame; when there are status requests and control requirements during the transmission of the FPGA main control, the FPGA main control transmitting the status requests or control commands to the chip or the chipset.

2. The communication method for a multi-chip neural network algorithm based on a FPGA main control according to claim 1, wherein the frame structure comprises:
   the original data frame comprising a frame instruction segment, a numerical status segment, a data segment and a verification segment; wherein the frame instruction segment comprises a frame start code, a frame identification code and a frame type code; the numerical status segment is a data structure, comprising a frame start code, an image frame height and an image frame width; the data segment comprises data to be transmitted grouped into sets of 32 bits for each transmission according to the data to be transmitted, a data arrangement mode is from a bottom bit to a high bit, and the high bit is supplemented by 0 for a last data segment less than 32 bits; and the verification segment adopts a checksum method to negate all data values of the frame instruction segment, the numerical status segment, the data segment and the verification segment by 1, and the data values are arranged from high to low, with high bits less than 32 bits being supplemented by 0, and the high bits exceeding 32 bits being reduced by 32 bits;
   the status frame comprising a frame instruction segment and a numerical status segment; wherein the frame instruction segment comprises a frame start code, a frame identification code and a frame type code, and the numerical status segment comprises a receiving correct status, a data counting error status, a data verification error status and a chip running error status;
   the layered data frame, the layered weight frame and the computation result frame all comprising a frame instruction segment, a numerical status segment, a data segment and a verification segment; wherein the frame instruction segment comprises a frame start code, a frame identification code and a frame type code; the numerical status segment comprises a data length code, layer number information, an image frame height and an image frame width; a framing method of the data segment is consistent with the original data frame; and a verification method of the verification segment is consistent with the original data frame;
   the layered data request frame, the layered weight request frame and the computation result request frame all comprising a frame instruction segment and a numerical status segment, and the layered data request frame, the layered weight request frame and the computation result request frame being used for requesting the layered data frame, the layered weight frame and the computation result frame, respectively; wherein the frame instruction segment comprises a frame start code, a frame identification code and a frame type code; and the numerical status segment comprises a data length code, layer number information, an image frame height and an image frame width; and
   the running status request frame comprising a frame instruction segment and a numerical status segment; wherein the frame instruction segment comprises a frame start code, a frame identification code and a frame type code; and the numerical status segment comprises a frame reception completion status, a frame reception error status, a chip status request frame, a main control FPGA status request frame and a status command given to the chip by the FPGA main control.

3. The communication method for a multi-chip neural network algorithm based on a FPGA main control according to claim 1, wherein the multi-chip structure based on the FPGA main control comprises one FPGA main control system and a plurality of chip nodes; and the FPGA main control system is connected with each chip node through a data connection line and a chip selection signal line.

4. A communication device for a multi-chip neural network algorithm based on a FPGA main control, comprising one or more processors configured for implementing the communication method for a multi-chip neural network algorithm based on a FPGA main control according to claim 1.

5. A computer-readable storage medium on which a program is stored, wherein the program, when executed by a processor, is configured to implement the communication method for a multi-chip neural network algorithm based on a FPGA main control according to claim 1.

6. The communication method for a multi-chip neural network algorithm based on a FPGA main control according to claim 2, further comprising:

controlling the transmission of the chip or the chipset by adjusting a structure of the frame instruction segment; transmitting the data at a first 32 bits of each frame to guide the FPGA main control interface module and the chip data reception module, and transmitted corresponding frame information to the chip or the chipset corresponding to the frame identification code according to the frame type code; wherein the frame instruction segment comprises transmitting according to a data number, repeated transmitting with a first bit being ignored, repeated transmitting with a first bit and a second bit being ignored, repeated transmitting with a first bit, a second bit and a third bit being ignored, repeated transmitting with a first bit, a second bit, a third bit and a fourth bit being ignored, repeated transmitting of all bits, allowing the data to be transmitted to the corresponding chip or the corresponding 2, 4, 8, 16 and 32 chips to repeatedly send the data.

7. The communication method for a multi-chip neural network algorithm based on a FPGA main control according to claim 6, further comprising:

adjusting flexibly the original data or any layer of the data, a total length of the data, the data structure and a number of a layer to which the data belongs based on a binary or multivalued neural network algorithm; after transmitting the data required for the multi-chip neural network algorithm through the original data frame, the layered data frame or the layered weight frame, framing the transmitted data, and transmitting the assembled frames to the chip or the chipset; after receiving the assembled frames, computing the assembled frames on the chip or the chipset, and sending the computation result frame to the main control by the chip.

8. The communication method for a multi-chip neural network algorithm based on a FPGA main control according to claim 7, wherein the method is capable of using a multi-application scene neural network algorithm of images, characters, voices, faces, objects and behaviors, and original data, intermediate operation data, weight and operation result data in each scene are all transmitted by the method; and the method is capable of handling the transmission of binary, ternary and multivalued data and binary, ternary and multivalued weights in the multi-chip neural network algorithm.

9. The communication method for a multi-chip neural network algorithm based on a FPGA main control according to claim 8, wherein the FPGA main control or the chip initiates a layered data request, a layered weight request or a computation result request at any time before, during and after the computation, and transmits the data, weights and computation results to be transmitted.

10. The communication method for a multi-chip neural network algorithm based on a FPGA main control according to claim 9, wherein the FPGA main control monitors and controls a status of a multi-chip system, and obtains a chip running status and a FPGA main control running status request frame through a running status request; and for the chip with a poor running status, the FPGA main control adjusts the chip running status by giving a status command to the chip.

\* \* \* \* \*